United States Patent
Matsumoto et al.

(10) Patent No.: US 6,711,264 B1
(45) Date of Patent: Mar. 23, 2004

(54) SECURITY IMPROVEMENT METHOD AND SECURITY SYSTEM

(75) Inventors: Tatsuro Matsumoto, Kawasaki (JP); Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/414,502

(22) Filed: Oct. 8, 1999

(30) Foreign Application Priority Data

Oct. 29, 1998 (JP) .......................................... 10-308007

(51) Int. Cl.$^7$ ................................................ H04L 9/00
(52) U.S. Cl. ...................................... 380/283; 380/277
(58) Field of Search ................................ 380/277, 283

(56) References Cited

U.S. PATENT DOCUMENTS

| | | | | |
|---|---|---|---|---|
| 4,965,804 A | * | 10/1990 | Trbovich et al. ............. | 713/153 |
| 5,434,920 A | * | 7/1995 | Cox et al. .................... | 380/257 |
| 5,452,358 A | * | 9/1995 | Normile et al. ............... | 380/42 |
| 5,513,261 A | * | 4/1996 | Maher ......................... | 380/277 |
| 6,105,131 A | * | 8/2000 | Carroll ....................... | 713/155 |
| 6,151,677 A | * | 11/2000 | Walter et al. ................ | 713/183 |
| 6,157,722 A | * | 12/2000 | Lerner et al. ................ | 380/260 |
| 6,189,100 B1 | * | 2/2001 | Barr et al. ................... | 713/182 |
| 6,263,437 B1 | * | 7/2001 | Liao et al. ................... | 713/169 |
| 6,266,413 B1 | * | 7/2001 | Shefi .......................... | 380/46 |
| 6,385,730 B2 | * | 5/2002 | Garrison ..................... | 713/202 |

FOREIGN PATENT DOCUMENTS

JP 9-321748 12/1997

* cited by examiner

*Primary Examiner*—Justin T. Darrow
(74) *Attorney, Agent, or Firm*—Staas & Halsey LLP

(57) ABSTRACT

A security system prevents a commonly shared encryption key from being deciphered by an unwelcome party, while providing easier administration of encryption keys. The security system includes a memorizer 2, an encrypter/decrypter 8, a user administrator 3, a key obtainer 4, and a key distributor 5. Once the chat client joins a channel, the user administrator 3 obtains and stores user information from the chat server. The user information includes a nickname list. The key obtainer 4 selects one from other user terminals to request an encryption key therefrom. Once the key obtainer 4 receives the encryption key sent by the selected user terminal, the key obtainer 4 stores the encryption key in the memorizer 2. When the user terminal receives a request for an encryption key from another user, the key distributor retrieves and sends the encryption key from the memorizer 2 of the requesting user terminal. The security system 1 should have a key updater 6, which updates an encryption key whenever a predetermined trigger occurs. Thus, the encryption key is less likely to be deciphered. Only user terminals with the key distribution and/or update properties can distribute and/or update an encryption key. The key distribution and update properties can be granted as part of the user information.

22 Claims, 7 Drawing Sheets

Conceptual Explanatory View of User Information

| NickName | Real Name | User ID | Client Name | Server Name | Connected Channel | Idle Time (sec) | Channel Operator | Key Distribution Property | Key Update Property | Order |
|---|---|---|---|---|---|---|---|---|---|---|
| taro | Taro Urashima | urashima | kame.ryugu.com | ryugu.com | #ryugu,#kame | 90 | 1 | 1 | 1 | 1 |
| hanako | Hanako Fujitsu | fujitsu | hana.fujitsu.com | fujitsu.com | #fujitsu,#ryugu | 60 | 1 | 1 | 1 | 2 |
| . | . | . | . | . | . | . | . | . | . | . |

Fig. 2

SECURITY IMPROVEMENT METHOD AND SECURITY SYSTEM

BACKGROUND OF THE INVENTION

A. Field of the Invention

The present invention relates to a technology that improves security of communications that take place in a computer network such as an intranet or the internet. More specifically, the present invention relates to a technology that improves security of conversations that take place in a chat system.

B. Definition of Terms

Hereinafter, a chat system refers to a system which includes a chat server and a plurality of chat clients, where a plurality of users can communicate each other simultaneously sharing a single channel. A channel is a virtual space where users are logically divided into a group, and what one of the users comments is broadcasted to all of the users who share the channel. A nickname is a name that identifies a user in a chat system. A channel operator property is an authority to administer users and modes within a channel. A bot is a software robot that participates in a channel to provide various services therein.

C. Description of the Related Art

Conventionally, in a chat system having a chat server and a plurality of chat clients, security of conversations between chat clients has been protected by encrypting conversation messages with a common key. The common key can be, for instance, a channel encryption key created by the chat server and distributed to a plurality of chat clients.

Also, there has been known a security method where a bot is connected to the server as one of chat clients, and the bot creates, distributes, and administers channel encryption keys. Another security method has been known where chat clients are provided with channel encryption keys in advance.

PROBLEM TO BE SOLVED BY THE INVENTION

In the above described method where the chat server creates channel encryption keys and distributes them to chat clients, security of conversation is protected in a communication path between the clients and the server. However, since the server has the channel encryption key, conversation messages may be decrypted on the server.

With the method where the bot administers the channel encryption keys, conversation messages can not be decrypted on the chat server, but may be decrypted on the bot. Also, it is troublesome to operate the bot, which has to be operated separately from the server. Although the method where chat clients are provided with channel encryption keys is simple, it does not allow the key to be updated. Therefore there is a higher possibility of the key being decrypted.

In view of the above, there exists a need for an improved security system for a chat system which overcomes the above mentioned problems in the prior art. This invention addresses this need in the prior art as well as other needs, which will become apparent to those skilled in the art from this disclosure.

SUMMARY OF THE INVENTION

One object of the present invention is to provide a method of and a device for improving security of conversation messages encrypted/decrypted with a channel encryption key, by making decryption of the channel encryption key difficult, while decreasing burden of administering the channel encryption key.

In accordance with one aspect of the present invention, a security method for ensuring privacy and security in a communication system where communication devices are configured to conduct simultaneous two-way communication via a single network. The security improvement method comprises steps of:

(A) generating an encryption key at at least one of the communication devices, where the encryption key is adapted to encrypt and decrypt communication contents within the network;

(B) requesting the encryption key from one of the other communication devices after a communication device joins the network;

(C) upon receiving a request for the encryption key from one of the communication devices, giving the generated encryption key to the requesting communication device; and (D) encrypting and decrypting communication contents exchanged between the communication devices within the network.

If the security improvement method is applied to a chat system, a channel encryption key is generated by a user who opened a channel. A user who joined the channel afterward requests the channel encryption key from the first user. The first user grants the encryption key upon receiving the request. In the present invention, the cannel encryption key is distributed in this manner, whereby channel encryption is not deciphered at the server or the bot.

Preferably, the security system of the present invention is utilized in a communication device that is configured to conduct simultaneous two-way communication with other communication devices sharing a single network. The security system preferably comprises memorizing means, encrypting means, decrypting means, user administering means, key obtaining means and key distributing means.

The memorizing means memorizes an encryption key adapted to encrypt and decrypt communication contents within the shared network. The encrypting means obtains communication contents from the communication device and encrypts the communication contents with the encryption key. The decrypting means obtains communication contents from the communication device and decrypts the communication contents with the encryption key.

The user administering means obtains from the communication device predetermined user information when the communication device participates in the network, and stores the user information in the memorizing means. The user information includes at least a list of other communication devices that participate in the network. The key obtaining means selects a communication device from one of the other communication devices in the list, requests an encryption key from the selected communication device, and stores the encryption key in the memorizing means when the encryption key is sent from the selected communication device upon the request. The key distributing means retrieves an encryption key from the memorizing means and distributes the encryption key to another communication device when the another communication device sent a request for the encryption key.

When the security system is utilized with a chat client, the user administering means obtains from the chat client user information including a list of nicknames of users who participate in the channel. The key obtaining means selects a user from the nickname list, and requests a channel encryption key from the user. At the user terminal, which received the request, the key distributing means retrieves a channel encryption key from the memorizing means, and sends the channel encryption key to the requesting user terminal. At the requesting user terminal, the key obtaining means receives the channel encryption key, and stores the channel encryption key in the memorizing means. The encrypting means and the decrypting means thereafter encrypt and decrypt conversation messages using the channel encryption key stored in the memorizing means.

Preferably, the security system is adapted to be coordinated with coordinating means of the communication device. The coordinating means is adapted to relay between the communication device and the security system a request for an encryption key, the encryption key sent upon the request, information regarding the user information and communication contents. The communication contents are relayed only when a predetermined condition is met.

When communication content received in encrypted, the coordinating means sends the communication content to the security system. After the communication content is decrypted in the security system, the decrypted communication content is sent from the security system to the communication device via the coordinating means, and is displayed in a similar manner as in the case of regular communication content. When communication content needs to be encrypted, the coordinating means sends the inputted communication content to the security system. After the communication content is encrypted in the security system, the encrypted communication content is sent from the security system to the communication device via the coordinating means, and is sent out in a similar manner as in the case of regular communication content.

Preferably in the security system of the present invention, the user administering means grants key distribution property based on the user information and stores the key distribution property in the memorizing means, where the key distribution property is adapted to allow distribution of an encryption key to another security system.

A chat client can obtain, as user information, informations such as nickname, user ID, whether the user is a channel operator or not. By making the key distribution property correspond to the channel operator property, the key distribution property can be configured to be granted if the user is a channel operator.

Preferably in the security system of the present invention, the user administering means selects another communication device based on a predetermined condition. The user administering means also grants key distribution property to the selected communication device, and obtains from the communication device a setting of the key distribution property and a name of a communication device to which the setting applies. The user administering means also stores the setting and the name in the memorizing means.

For instance, if the chat client has opened a channel, the user administering means of the chat client selects another user terminal. The user administering means can select user terminals by selecting a predetermined number of user terminals randomly from the chat clients who participate in the channel, or by selecting a predetermined number of chat clients in order of participation in the channel. To allow other user terminals to grant the key distribution property, the key distribution property should be configurable as part of the user information by adding an extension protocol to a protocol of the chat system. It is also possible to make the key distribution property grantable by other user terminals through a setting command, as in the case of setting a channel operator.

Preferably in the security system of the present invention, the user administering means accepts a selection of another communication device, and a command for granting and canceling the key distribution property to the selected communication device, where the key distribution property allows distribution of an encryption key, obtains from the selected communication device a setting of the key distribution property and a name of the communication device to which the setting applies, and stores the setting and the name of the communication device in said memorizing means.

By allowing the user to grant and cancel the key distribution property, the user can adjust the amount of burden of key distribution at each user terminal.

Preferably in the security system of the present invention, the key obtaining means selects, based on a predetermined condition, a communication device from which an encryption key is requested.

In other words, the key obtaining means selects a user terminal from which a channel encryption key is requested by generating random numbers or by applying a predetermined condition such as that the user terminal to be selected should have the key distribution property.

Preferably in the security system of the present invention, the key obtaining means selects, based on a predetermined condition, a communication device from which an encryption key is requested, requests an encryption key from the selected communication device, and if the communication device does not send the encryption key within a predetermined period of time, selects another communication device for requesting an encryption key therefrom.

If the encryption key is not sent from the requested user terminal for more than a predetermined period of time, the key obtaining means determines that the requested user terminal had a trouble in sending the encryption key, and therefore reselects another user terminal to request the encryption key therefrom. The user terminal is selected based on a predetermined condition such as that the user terminal to be selected should have the key distribution property.

Preferably in the security system of the present invention, the key obtaining means requests obtainment of an encryption key when the communication contents are encrypted.

For instance, if a chat system is configured to be in encryption mode, where all the communication contents within the channel are encrypted, the key obtaining means obtains from the chat client the mode of the channel in which the user participates. If the encryption mode is on, the key obtaining means requests obtainment of an encryption key.

Preferably in the security system of the present invention, the decrypting means determines that a request for an encryption key should be made when communication contents received from the communication device cannot be decrypted; and the key obtaining means requests obtainment of an encryption key based on the determination of said decrypting means.

The security system can also be configured to allow the encryption mode to be changed for each conversation message. For instance, the user chooses whether a conversation message should be encrypted or not by pressing an on/off command button shown by the GUI (Graphic User Interface). When the encryption mode is on, the encrypting means attaches an encryption flag at the beginning of the encrypted conversation message. The communication device adds a send command to the conversation message, and sends them to the network. When the receiving user terminal does not have an encryption key to decrypt the encrypted conversation message, or when the encryption key that the receiving user terminal has cannot decrypted the received encrypted conversation message, the decrypting means of the receiving user terminal determines that an encryption key should be requested. The key obtaining means of the receiving user terminal requests obtainment of an encryption key based on the determination of the decrypting means.

Preferably in the security system of the present invention, the memorizing means stores a plurality of encryption keys and key identification IDs in a manner in which the encryption keys and the key identification IDs correspond to each other. The encrypting means is adapted to send key identification information and communication contents to the network via the communication device. The key identification information identifies the encryption key to be used for encrypting the communication content. The decrypting means examines whether an encryption key identified by key identification information is stored in said memorizing means. If the encryption identified by the key identification information is not stored in said memorizing means the key obtaining means requests obtainment of an encryption key specifying the key identification information.

In this case, the encryption mode is set for each conversation message. If the decrypting means determines that the user terminal does not have the encryption key used for encrypting the particular conversation, the key obtaining means requests obtainment of a channel encryption key based on the determination. The key obtaining means identifies the particular encryption key requested by identifying a key identification number. Examples of key identification number include a serial number of the channel encryption key assigned to each channel encryption key generated since the channel is opened, and a value obtained by applying a one-way function such as hash function to a channel encryption key.

Preferably in the security system of the present invention, the key obtaining means sends a public key of a requesting user from a public key encryption system along with the request for an encryption key, and decrypts the encryption key with a private key of the requesting user from the public key encryption system when the encryption key is sent. The key distributing means distributes an encryption key after encrypting the encryption key with the public key from the public key encryption system of the requesting user.

The key obtaining means of the requesting communication device requests an encryption key by giving its own public key. The key obtaining means of the communication device, which received the request, sends the requested encryption key after encrypting the encryption key with the public key. Upon receiving the encrypted encryption key, the key obtaining means of the requesting communication device decrypts the encrypted encryption key, thereby obtaining the encryption key.

In accordance with another aspect of the present invention, when a request for an encryption key is sent from one of the other communication devices, the key distributing means is adapted to verify the request, retrieve one of the encryption keys based on a result of the verification, and send the encryption key to the requesting communication device.

At a communication device, which received a request for a channel encryption key, the key distributing means verifies the legitimacy of the request. If it turns out that the request came from a legitimate user, the key obtaining means retrieves a channel encryption key from the memorizing means, and sends it to the requesting user terminal. In the previous example where the public key of the requesting user terminal is utilized to encrypt the encryption key, the key distributing means should also verify the legitimacy of the public key. Examples of legitimate public key include a public key having an electronic signature of authenticator, and a public key having an electronic key of the user from whom the electronic key is requested.

In accordance with another aspect of the present invention, the security system of the present invention further includes key updating means for updating an encryption key at a predetermined time, and distributing the updated encryption key to other communication devices.

By updating the encryption key at certain times, it becomes more difficult for a third party to decipher the encryption key, whereby communications are protected better. Examples of times at which the encryption key can be updated include: every certain period of time; when a certain number or a certain amount of conversation messages has been made in the channel; when the number of participants in the network exceeds a predetermined number; when a certain period of time elapsed since the last comment made; and when the requests an encryption key be updated. It is also possible to configure the key updating means such that an encryption key is distributed only when conversations in the channel stop, not while the conversations in the channel continue.

In accordance with another aspect of the present invention, the security system of the present invention further includes key updating means for updating an encryption key at a predetermined time, and distributing the updated encryption key to other communication devices after encrypting the updated encryption key with a second latest encryption key.

By encrypting the updated encryption key with the second latest encryption key, it is less likely that the updated encryption key will be deciphered while being distributed.

Preferably in the security system of the present invention, the key updating means generates an encryption key based on any or a combination of secret information stored inside each communication device, time information, and information unique to the network.

A new encryption key can be generated from, for instance, a serial number of the mother board, an address in which the program is stored, time at which the encryption key is to be updated, channel name, and/or a password.

Preferably in the security system of the present invention, the key updating means generates an encryption key by applying a one-way function, to any or a combination of secret information stored inside each communication device, time information, and information unique to the network.

A new encryption key can be generated by applying hash function to, for instance, a serial number of the mother board, an address in which the program is stored, time at which the encryption key is to be updated, channel name, and/or a password.

Preferably in the security system of the present invention, the user administering means sets key update property based on the user information obtained, with the key update property adapted to allow update and distribution of an encryption key, and stores the key update property in the memorizing means. The security system further includes key updating means for updating an encryption key at a predetermined time based on the setting of the key update property, and distributing the encryption key to other communication devices.

As in the case of the above described key distribution property, the key update property can be granted to users who have the channel operator property, or to users who stayed in a channel through the end thereof. The key update property can also be made configurable as part of the user information by adding an extension protocol to the original protocols. The key updating property can also be made configurable through a configuration command of a channel operator.

In accordance with another aspect of the present invention, the user administering means is adapted to select another communication device based on a predetermined condition when the user has key update property which allows distribution of an encryption key, grant the key update property to the selected communication device, obtain a setting of the key update property and a name of the communication device to which the setting applies, and store the setting and the name of the communication device in said memorizing means. The security system further includes key updating means for updating an encryption key at a predetermined time based on the setting of the key update property, and distributing the encryption key to other communication devices.

Users who have the key updating property can allow other users to grant the key updating property. The other users are selected by randomly selecting a predetermined number of communication devices, by selecting a predetermined number of communication devices in order of participation in the channel, or by selecting communication devices from the communication device list. The key update property can be granted by setting a new command in the chat system. User terminals participating in the chat system update the user information according to the command.

Preferably in the security system of the present invention, the user administering means grants key update property and an updating order or sequence based on the obtained user information, and stores the key update property and the updating order or sequence in the memorizing means. The key update property is adapted to allow update and distribution of an encryption key. The security system further includes key updating means for updating an encryption key at a predetermined time based on key update property and an order or sequence, and distributing the encryption key to other communication devices.

For example, the key update property can be granted to users who have the channel operator property, whereas the updating sequence can be the order in which the user participated in the channel. The user administering means of a user terminal which is second or later in the updating sequence automatically shifts upwardly when the communication device which is first in the updating sequence leaves the network, or when a certain period of time elapsed since the last time an encryption key was updated and therefore it is determined that the communication device with the first order had a trouble updating the encryption key. The order in the updating sequence is shifted upward by one from the prior order given in the user information. Thereafter, the communication device that became first in the updating sequence generates an encryption key at a predetermined time.

The security system further includes key update means for updating an encryption key at a predetermined time based on key update property and an order, and distributing an encryption key to other communication devices. Preferably in the security system of the present invention, the user administering means is adapted to select another communication device based on a predetermined condition when a user has key update property. The key update property allows the user to update and distribute the encryption key to other users. The key update property also allows the user to grant the key update property and the updating sequence to the communication device. The key update property also allows the user to obtain from the communication device settings for the key update property, the updating sequence and a name of the communication device to which the settings apply. The key update property also allows the user to store the settings and the name in said memorizing means, and rewrite the updating sequence as the user information changes.

For instance, the communication device that is the first in the updating sequence can distribute and update a channel encryption key. The communication devices that are second or later in the updating sequence receive a new channel encryption key distributed by the communication device that is the first in the updating sequence. When the communication device that is first in the updating sequence leaves the network, or when a predetermined period of time elapsed since the last time an encryption key was updated, and therefore it is determined that the communication device that is first in the updating sequence had a trouble updating the encryption key, the communication devices that are second or later in the updating sequence automatically shift in order by one from the prior order stored in the user information. Thereafter, the communication device that became first in the order distributes and updates an encryption key.

In accordance with another aspect of the present invention, the security improvement system comprises a plurality of communication devices adapted to conduct simultaneous two-way communication sharing a single network. Each of the communication devices includes memorizing means, encrypting means, decrypting means, user administering means, key obtaining means, and key distributing means.

The memorizing means memorizes an encryption key adapted to encrypt and decrypt communication contents within the shared network.

The encrypting means obtains communication contents from the communication devices, and encrypts the communication contents with the encryption key. The decrypting means obtains communication contents from the communication devices and decrypts the communication contents with the encryption key. The user administering means obtains from the communication device predetermined user information when the communication device participates in the network, and storing the user information in the memorizing means. The user information includes at least a list of other communication devices that participate in the network.

The key obtaining means selects a communication device from the communication devices in the list, requests an encryption key from the selected communication device, and stores the encryption key in the memorizing means when the encryption key is sent from the selected communication device upon the request. The key distributing means retrieves an encryption key from the memorizing means and distributes the encryption key to another communication device when the another communication device sent a request for the encryption key. Preferably, this security system of the present invention has similar effects as the security system of discussed above.

Preferably in the security system of the present invention, a computer readable recording medium is to be utilized in a communication device that is adapted to conduct simultaneous two-way communication with other communication devices sharing a single network. The computer readable recording medium contains a security improvement program therein. The security improvement program is configured to execute the steps of:

(A) storing an encryption key adapted to encrypt and decrypt communication contents within the shared network;

(B) encrypting the communication contents with the encryption key;

(C) decrypting the communication contents with the encryption key;

(D) obtaining from the communication device predetermined user information when the communication device participates in the network, and storing the user information in memorizing means, with the user information including at least a list of other communication devices that participate in the network;

(E) selecting a communication device from the communication devices in the list, requesting an encryption key from the selected communication device, and storing the encryption key in the memorizing means when the encryption key is sent from the selected communication device upon the request; and (F) retrieving an encryption key from the memorizing means and distributing the encryption key to another communication device when the another communication device sent a request for the encryption key. Preferably, this security system of the present invention has similar effects as the security system of discussed above.

These and other objects, features, aspects and advantages of the present invention will become readily apparent to those skilled in the art from the following detailed description, which, taken in conjunction with the accompanying drawings, discloses preferred embodiments of the present invention. In the accompanying drawings like reference numerals are used to denote corresponding parts throughout.

BRIEF DESCRIPTION OF THE DRAWINGS

Referring now to the accompanying drawings which form a part of this original disclosure:

FIG. 2 is an explanatory view showing an example of user information for use in security systems in accordance with the present invention;

DETAILED DESCRIPTION OF THE INVENTION

Referring to FIGS. 1–7, security systems are described below in accordance with preferred embodiments of the present invention. In the preferred embodiments described hereinafter, the security system 1 of the present invention is utilized together with a chat client 10 in a communication device for improving the security within a communication or chat system to protect the privacy of the communications occurring therein.

First Embodiment

A first embodiment will now be described for use with a chat system to illustrate one example of an application of the present invention. It should be understood that other applications of the invention are possible.

In such a chat system, conversation messages or communications (i.e. real time messages sent back and forth between a plurality of users at communication devices) are encrypted by each message sender and decrypted by each receiving user engaged in the conversation in a specific chat room. An example of a chat system that is administered by a chat server is schematically depicted in FIG. 1.

Figure 1:
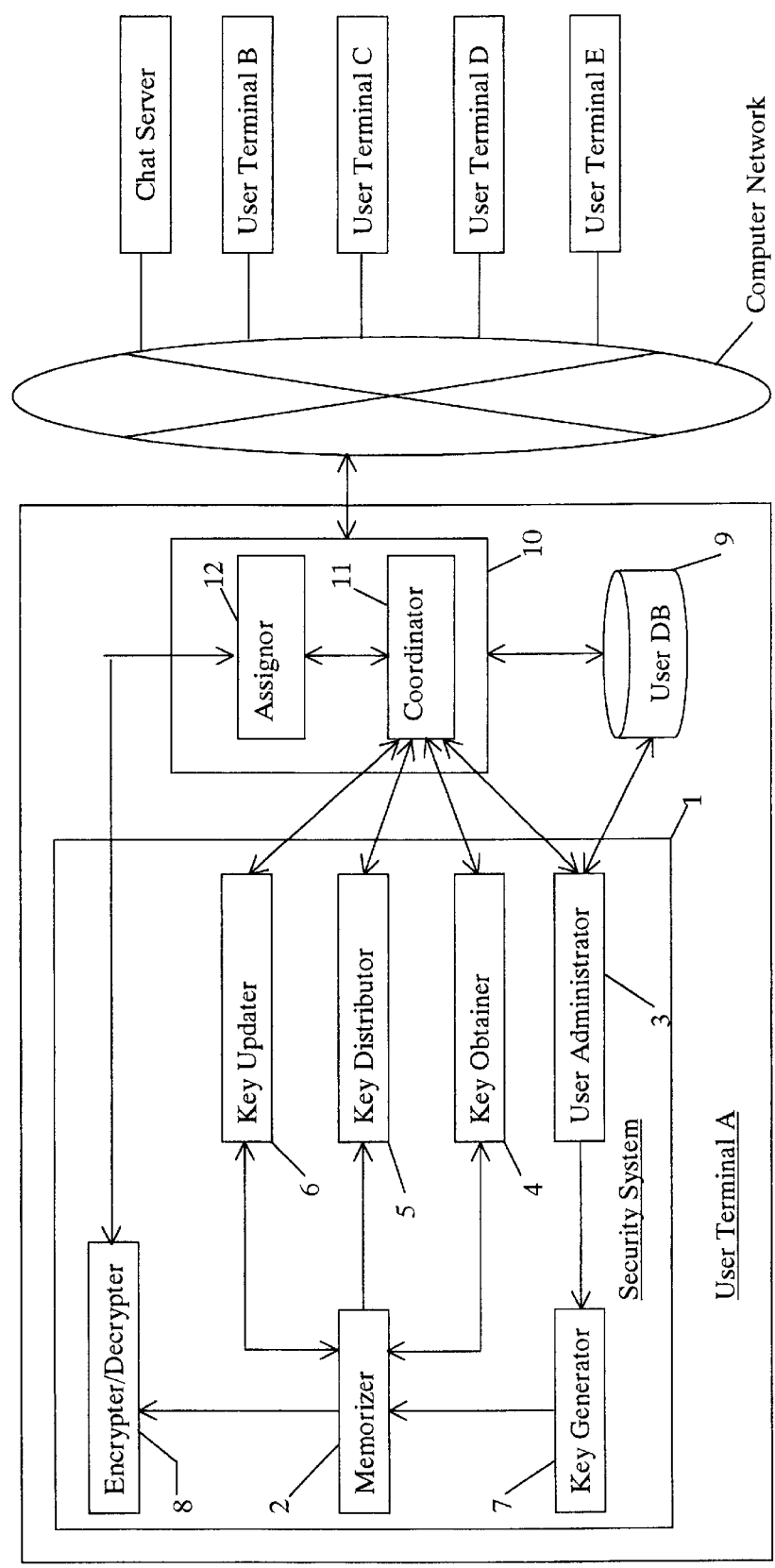
FIG. 1 is a functional block view of a security system in accordance with first embodiment of the present invention.

As depicted in FIG. 1, the chat system basically includes the chat server connected to a plurality of communication devices such as user terminals A, B, C, D and E. Of course, other types of communication devices can be used with the present invention. Typically, one user uses a communication device or user terminal to engage in a conversation in a chat room administered by the chat server which a plurality of other users, each user at his or her own communication device or user terminal. The chat server and the communication devices or user terminals A, B, C, D and E are connected via a communication or computer network to the chat server. The communication network may be any of a variety of computer networks, such as a Local Area Network (LAN) or the Internet. The communication network allows for real time electronic communication between the communication devices or user terminals A, B, C, D and E and the chat server.

The chat server may be configured to administer a plurality of chat rooms or chat channels by directing communications in and out of each individual chat channels to and from the user terminals accessing each individual chat channel. Specifically, communications are segregated. Thus, only messages sent to a specific chat channel are allowed to be transmitted to user terminals logged on to that specific chat channel.

In the description below, each chat channel is an electronic conference room having an identifier such as a name or address, unique to that chat channel. As is described in greater detail below, when the invention is used in a group e-mail application, each user of an e-mail type electronic conference room is identified in a user list. For example, each user is identified by an e-mail address such that each user has his or her own unique e-mail address.

As shown in FIG. 1, the chat system includes user terminals A, B, C, D and E engaged in a conversation with one another on a chat channel administered by the chat server. Each of the user terminals A, B, C, D and E on the chat channel includes a security program or system 1 installed therein. Only five user terminals are depicted in FIG. 1. However, it should be understood that any number of user terminals could be installed with the security program or system 1, so long as each user terminal is authorized to participate in communications in the electronic conference room (chat channel or chat room). It should also be understood that the user terminals A, B, C, D and E are, for instance, personal computers or similar terminal devices that include a display or monitor such as a CRT, a storage means such as a hard drive, a central processing unit (CPU) memory such as RAM and a means for connecting to the network such as LAN card or a modem.

In order to log onto a chat room or communicate in an electronic conference room, some kind of computer communication software application is necessary to effectively communicate with the chat server and other user terminals. The computer software may be any of a variety of software applications. However, for the purpose of describing the present application, the software application used to communicate with the electronic conference room will hereinafter be referred to as a chat client 10 installed in each of the user terminals A, B, C, D and E.

FIG. 1 shows a functional structure of a communication chat system, which is utilized together with a chat client 10. Any of the plurality of the user terminals A, B, C, D, and E in FIG. 1 can run chat client 10 thereon. The user terminals A–E are connected to each other via the chat server and a computer network. A security system 1, as well as the chat client 10 is installed in each of the users' terminals.

The security system 1 basically includes a memorizer 2, a user administrator 3, a key obtainer 4, a key distributor 5, a key updater 6, a key generator 7 and an encrypter/decrypter 8. The security system 1 is operatively coupled to the chat client 10 and a user database (DB) 9. The chat client 10 includes a coordinator 11 and assignor 12, which function with one or more portions of the security system 1 and the user database (DB) 9. In this embodiment, channel encryption keys for encrypting and/or decrypting conversation messages are generated and/or distributed by one or more of the user terminals A–E, each of which has a security system 1 and a chat client 10 installed thereon.

The memorizer 2 stores a public key and a private key of the user. The public key and the private key are generated according to the public key encryption system. The memorizer 2 also receives a channel encryption key from the key obtainer 4 for encrypting and/or decrypting conversation messages in a channel in which the chat client 10 participates. The memorizer 2 stores the channel encryption key at the user terminal. Furthermore, the memorizer 2 also receives and stores an encryption key ID from the key obtainer 4. The encryption key ID identifies a certain channel encryption key. The memorizer 2 stores the channel encryption key and the encryption key ID in an encryption key list such that the channel encryption key and the encryption key ID correspond to each other. The memorizer 2 can store more than one channel encryption key with the corresponding encryption key ID. When several channel encryption keys are stored, it is preferable that the user set the maximum number of channel encryption keys that can be stored in the memorizer 2 in advance.

The user administrator 3 refers to user information for setting key distribution property and key update property based upon the user information. A chat client 10 obtains user information from the chat server. FIG. 2 shows an example of user information that includes the key distribution property and the key update property.

The key distribution property in this context indicates who is assigned the task of distributing a channel encryption key to other user terminals. In other words, the user who has the key distribution property is allowed to distribute a channel encryption key to other user terminals.

The key update property in this context indicates who is assigned the task of updating a channel encryption key and also the task of distributing the channel encryption key to other user terminals. In other words, the user who is assigned the key update property is allowed to update a channel encryption key and also to distribute the channel encryption key to other user terminals.

The channel operator property in this context indicates the user who opened the channel. This user is called the operator of the channel or the channel operator. The channel operator is typically assigned the tasks of generating and distributing at least the first channel encryption key.

Usually, the chat clients 10 can automatically obtain certain kinds of user information about the other user in the channel from the chat server by merely participating in a channel. The kinds of user information that a chat client 10 can automatically obtain includes (1) nickname, (2) real or actual name of the user, (3)-user ID for identifying a particular user in the network, (4) client name for identifying a users terminal which runs a particular chat client, (5) server name which identifies the server to which the users terminal is connected, (6) list of channels to which each of the users is connected, (7) idle time between communications made by the user in the channel and (8) the channel operator property status (0/1). Each user should have at least one unique piece of user information to distinguish that user from other users in the channel. Out of the above-mentioned user information, the nickname is preferably used to identify a user in a channel.

In the examples of user information shown in FIG. 2, the chat client 10 preferably obtains all of the above-listed kinds of user information (1–8) from the chat server. The chat client 10 then writes the user information to the user database (DB) 9. The user administrator 3 grants or assigns the key distribution property and the key update property as needed based upon the channel operator property in the user information that the chat client 10 obtained from the chat server. The key distribution property and the key update property are then stored in the user database (DB) 9.

In the illustrated example, if the channel operator property is set to "1", the key distribution property and the key update property are also set as "1". In other words, the key distribution property and the key update property are granted or granted to the user, if the client server has set the channel operator property of the user to "1".

The user administrator 3 is informed by the coordinator 11 of the chat client 10 of changes in the user information such as the setting of a new channel operator or a user entering or leaving the channel. In this way, the user information is updated in the security system 1 as changes arise in the channel. The coordinator 11 will be explained in more detail later.

Of course, there are other ways to grant or change the key distribution property and the key update property. One of the ways to grant or change the settings of these properties is for the user administrator 3 of the security system 1 at the user terminal to select users according to predetermined conditions, and sets these properties for each user based on the predetermined condition. In other words, the key distribution property and the key update property of one user is set by the user administrator 3 of another user in the channel.

Users to whom the key distribution property is to be given can be selected in various ways. For example, the key distribution property can be granted to users by selecting a predetermined number of users randomly by generating random numbers. Alternatively, the key distribution property can be granted to users either manually or automatically by selecting a predetermined number of users based upon the order the user joined the channel. Also, the key distribution property can be granted by selecting a first user who in turn selects other users.

Users to whom the key update property is to be given can be selected in various ways. For example, the key update property can be granted to users by selecting the user or users who opened the channel. Alternatively, the key update property can be granted to users by selecting users who will stay in a channel through the end of the channel. Users to whom the key update property is to be given can also be selected by having the users, who already have the key update property, select a predetermined number of other users. For instance, the users can select additional users to be granted the key update property based upon the order the user joined or started participating in a channel. Also, the users who have the key update property can also manually select a predetermined number of other users based upon the needs of the users in the channel.

Another way to grant the key distribution property and the key update property to the selected users is to install a property distribution command. As an example, suppose that a command for granting the key distribution property is "MODE #CH1 +d userA", while the command for granting the key update property is "MODE #CH1 +x userA". Here, #CH1 is a channel name, and userA is a nickname of a user within the channel. The user administrator 3 specifies what property should be distributed to which users, and then sends the commands to all of the chat clients 10 of the user terminals that are participating in the channel. In the user terminals that receive the command, the user administrator 3 receives the command via the chat client 10. The user administrator 3 then interprets the command, and rewrites or stores the user information in the user database (DB) 9 at the user terminal.

When several of users have been granted the key update property, the user administrator 3 of one of the user terminals should also set an order or sequence in which the channel encryption key should be updated by the various users with the key update property. For example, each user with the key update property can assign a new channel encryption key based on the order or sequence in which the user joined the channel relative to the other users. In other words, the user who first opened the channel is given the channel operator property and the key update property will be the first one to update the channel encryption key. Similarly, the order or sequence in which other users can update the channel encryption key is based upon the order or sequence in which the user participated or joined in the channel relative to the other users.

Alternatively, only one user is initially given the key update property. This first user then randomly or manually grants a number of other users the key update property. This process can be done by the user administrator 3 of the first user terminal. The first user who originally had the key update property will also be the first user to update the channel encryption key. Then, the other users that are selected by the user administrator 3 of the first user terminal are given the key update property randomly or manually. For example, the other users with the key update property are then assigned a position in the updating sequence by the order of participation in the channel relative to the other users. In this way, the order or sequence in which the channel encryption key is updated by the several users is determined.

The command for granting the key update property preferably includes the position in the updating sequence in which the user will update the channel encryption key. For example, a setting for the relative position in which the users update the channel encryption key can be included in the command for granting the key update property by adding a natural number "n" after an extension "x" in the command, where the number "n" shows the order of the user. In other words, a command for both granting the key update property to "userA" and for assigning "userA" the second position in the sequence for updating the channel encryption key is "MODE #CH1 +x2 userA". The updating order or sequence and the assignment of the key update property are sent to all the user terminals in the channel. In this way, the user administrator 3 of each user terminal can rewrite the updating order or sequence whenever a change occurs in user information. For instance, when one of the users that has been assigned the key update property leaves the channel, the order or sequence in which the users update the channel encryption key changes. In other words, the sequence of the rest of the users with the key update property are affected because of the leaving user.

The key obtainer 4 selects other users according to predetermined conditions, and requests a channel encryption key from the selected users. Also, the key obtainer 4 stores the channel encryption key in the memorizer 2 upon the request. The method of selecting users from which a channel encryption key is requested is not limited to any particular method. For instance, users can be selected randomly by generating random numbers. Alternatively, the users can be selected from the users who have the key distribution property in order of participation in the channel. If there is no response from the selected user terminal for more than a certain period of time due to such reasons as the selected user terminal is busy or the communication path is crowded, the key obtainer 4 selects another users terminal, and requests the channel encryption key from the newly selected user terminal.

A request for a channel encryption key includes predetermined information and a user certificate. The predetermined information includes at least channel name and user information such as nickname which specifies the requesting user. The user certificate includes information regarding the user, a public key of the requesting user and an electronic signature from a Certificate Authority (CA), which certifies the information in the certificate. The certificate is usually authorized by a Certificate Authority (CA), but can also be authorized by the chat server to which the users terminal is connected, or by the user from which the channel encryption key is requested.

A request for a channel encryption key is made when the key obtainer 4 recognizes an encrypted communication. More specifically, it is when the key obtainer 4 recognizes that the channel is in the encryption mode, e.g., where all the communications within the channel are encrypted, or when an encrypted communication or conversation message is received.

In the case where the channel is in the encryption mode, there should be a command for setting an encryption mode, where all the communications or conversation messages within the channel are encrypted. The command for setting such encryption mode can be, for instance, a command that utilizes an extension of "MODE" command, such as "MODE #CH1 +c". Usually, when a chat client 10 participates in a channel, the mode set in the channel is reported to the chat client 10. The key obtainer 4 retrieves the mode from the coordinator 11 of the chat client 10, and requests a channel encryption key if the channel is in the encryption mode.

In the case where the channel is not in the encryption mode but an encrypted conversation message is received, an encryption flag can be sent with each of the conversation messages sent out for indicating whether the conversation message is encrypted or not. A regular chat system generates a conversation message that includes actual conversation content and a send command, which is a command to send the conversation message. In this embodiment, a conversation message generated further includes an encryption flag, which shows the encryption mode for the message being on (0) or off (1). The encryption flag is preferably at the beginning of the conversation message.

Instead of an encryption flag, an encryption key ID can also be utilized. As will be described later, the encryption flag is added to conversation content of the message by the encrypter/decrypter 8. When the encrypter/decrypter 8 can not decrypt conversation content that it received from the chat client 10, the key obtainer 4 requests a channel encryption key according to a command received from the encrypter/decrypter 8. The command from the encrypter/decrypter 8 will be described later. Also, a more detailed explanation will follow regarding a case where the encrypter/decrypter 8 can not decrypt a conversation content.

Preferably, the channel encryption key that the key obtainer 4 receives is encrypted with a public key of the requesting user. The key obtainer 4 obtains the channel encryption key by decrypting the encrypted channel encryption key with the private key of the user. In another case, the key obtainer 4 receives an encryption key ID and the encrypted channel encryption key. The key obtainer 4 decrypts the encrypted channel encryption key and stores the obtained channel encryption key and the encryption key ID in the encryption key list of the memorizer 2.

If the requesting user terminal does not have the key update property, or the key update property of the requesting user terminal does not have the first priority, the key obtainer 4 obtains a new channel encryption key from other user terminals. The newly obtained channel encryption key is encrypted with the second latest channel encryption key next to the newly received channel encryption key. Therefore the key obtainer 4 retrieves the second latest channel encryption key from the memorizer 2, and decrypts the newly obtained channel encryption key with the second latest channel encryption key. Then, in a similar manner, an encryption key ID is obtained from the decrypted channel encryption key, and is stored in the encryption list, such that the encryption key ID and the channel encryption key correspond to each other.

If a new channel encryption key is not received after a predetermined period of time, during which a channel encryption key should be updated, the key obtainer 4 requests the user administrator 3 that the order of key update be changed. Upon receiving the request, the user administrator 3 changes the order of key update property to an earlier order. Updating of the channel encryption key will be described more in detail later.

The key distributor 5 verifies requests for channel encryption key received from other user terminals. The request for channel encryption key, as well as the user certificate received from the requesting user is utilized to verify the request.

Once the requester is proven to be a registered user as a result of the verification, the latest channel encryption key is retrieved from the encryption key list. The latest channel encryption key is encrypted with the public key of the requesting user, which was included in the user certificate of the request. The key distributor 5 also obtains the encryption key ID of the retrieved channel encryption key by applying a one way function such as a hash function to the retrieved channel encryption key, and sends both the encrypted channel encryption key and the encryption key ID to the requesting user.

The encryption key ID only has to specify the channel encryption key uniquely. Therefore, a serial number, or the date and time the channel encryption key is generated can also be an encryption key ID.

If the encryption ID is sent along with the request for channel encryption key, the key distributor 5 sends the channel encryption key that corresponds to the encryption key ID.

The key updater 6 generates channel encryption keys and sends the channel encryption keys to other user terminals at appropriate times. For example, new channel encryption keys can be generated every certain period of time. Also, the new channel encryption keys can be generated based upon the number of conversation messages or the amount of conversation data occurring in the chat client. In other words, a new channel encryption key can be generated every time a certain number of conversation messages has been made, or a certain amount of conversation data has been made. Furthermore, a new channel encryption key can be generated by watching user information. For example, a new channel encryption key can be generated when the number of users in the channel increases by a predetermined number such as 1. Alternatively, a new channel encryption key can be generated when the topic of the channel changes, or when a certain period of time elapses since the last conversation message is made, or when a user requests that a new channel encryption key be made.

The key updater 6 can be configured to send out the new channel encryption key right after the new channel encryption key is generated. However, it is preferable that the new channel encryption key be sent out when conversation in the channel stops, instead of in the middle of a conversation so that the conversation is not interrupted.

A new channel encryption key can be generated by combining information such as secret information stored in a user terminal, time information, and information unique to the channel, and applying a one way function such as a hash function to the combined information. The secret information stored in a user terminal should be information that is difficult for an unknown party to guess, such as a serial number of the motherboard of the terminal, or an address of a certain program. It is even more preferable if the secret information is a kind of information that changes over time, instead of static information.

The time information, which a time datum of the time when the channel encryption key is generated, is obtained through a time datum obtainment program routine. The time datum obtainment program routine utilizes an internal clock of a user terminal, which is usually provided in an operating system that runs on the user terminal. The time datum takes a form of a cumulative number of seconds since Jan. 1, 1970, which is the datum that the time datum obtainment program routine outputs, and is therefore generally utilized. The channel specific information can be information such as channel name, or a password assigned to the channel.

It is more preferable from the point of view of security that the new channel encryption key is sent after being encrypted, rather than being sent without being encrypted. For instance, if the new channel encryption key is sent after being encrypted with the second latest channel encryption key, it is more difficult for an unknown party to decrypt the encryption, while the receiving terminal can decrypt the encryption.

The channel encryption key should be generated and distributed according to the key update property in the user information. In other words, the channel encryption key should be generated and distributed only when the key update property is granted to the user in the user information. As described above, the key update property is configured at each user terminal by the user administrator 3. When the order or sequence for updating the channel encryption key and the key update property of the users are already set, the channel encryption key should be updated in a following manner.

In the user terminal, which is first in the key updating sequence, the key updater 6 generates a new channel encryption key in a manner described above, at a predetermined time, and later sends the channel encryption key to the other user terminals in the channel. In the case of the user terminal which is second or later in the key updating sequence receives the channel encryption key from the first order user terminal. If a new channel encryption key is not sent to a user terminal after a predetermined period of time, the non-receiving user terminal determines that the first order user terminal was not able to send the channel encryption key to the user terminal for some reason. This determination is made by the key obtainer 4 as described above. Then, the user administrators 3 in all receiving user terminals change the updating sequence or order upward, whereby the next user terminal with the key update property generates and distributes a channel encryption key.

If the chat client 10 of the user terminal is first to open a channel, the key generator 7 of the user terminal generates the first channel encryption key. New channel encryption keys are then generated in a similar manner by other user terminals in accordance with the key updating sequence in the channel.

As mentioned above, the channel encryption key is preferably based upon combining secret information of the user terminal, time information and channel specific information. A hash function is then applied to the combined information. The time information, for instance, can be a time datum of the time when the channel was opened.

The key generator 7 then generates an encryption key ID by applying hash function to the channel encryption key in a similar manner in which the key distributor 5 generates an encryption key ID. Then, the channel encryption key and the encryption key ID are stored in the memorizer 2, such that the channel encryption key and the encryption key ID correspond to each other.

The encrypter/decrypter 8 retrieves the channel encryption key from the memorizer 2 when an encrypted conversation message is sent from the assignor 12 of the chat client. Details of the assignor 12 will be described later. The encrypter/decrypter 8 then decrypts the encrypted conversation message using the retrieved channel encryption key. The latest channel encryption key is usually utilized to decrypt the conversation message. However, if the encrypted conversation message bears an encryption key ID at the beginning thereof, the channel encryption key that corresponds to the encryption key ID should be utilized to decrypt the conversation message.

If the encrypter/decrypter 8 can not decrypt the conversation message, the encrypter/decrypter 8 directs the key obtainer 4 to request an updated channel encryption key. The conversation message can not be decrypted in the case where the channel encryption key that corresponds to the encrypted conversation message is not stored in the memorizer 2. Also conversation message can not be decrypted in the case where the channel encryption key that corresponds to the encryption key ID that is sent with the encrypted conversation message is not stored in the memorizer 2. The decrypted conversation message is again sent to the chat client, and then displayed in the screen of the user terminal, as in the case of a regular message.

Once the encrypter/decrypter 8 receives a conversation message to be encrypted from the assignor 12, the encrypter/decrypter 8 encrypts the conversation message using the latest channel encryption key. Preferably, an encryption flag or an encryption key ID is attached to the beginning of the encrypted conversation message. Thereafter, the conversation message is sent to the chat client 10. The chat client 10 sends the conversation message and data received from the security system 1 with a send command attached thereto, as in the case of a regular conversation message.

Chat Client

As shown in FIG. 1, the chat client 10 according to this embodiment includes the coordinator 11 and the assignor 12, which function with one or more elements of the security system 1. The coordinator 11 interprets commands sent and received by the chat client 10, and assigns processes to each element of the security system 1. More specifically, once the coordinator 11 interprets a command by which the user information changes, the coordinator 11 reports to the user administrator 3 about the change of the user information. Examples of such command include "PART", which is a command that shows that a user has left, "JOIN", which is a command that shows that a user has joined, "MODE #CH1 +o", which is a command to grant authority of a channel operator, "MODE #CH1 +d userA", which is a command to grant the key distribution property, and "MODE #CH1 +xn userA", which is a command to grant the key update property and the order thereof. The coordinator 11 also receives from the user administrator 3 "MODE #CH1 +d userA", which is a command to grant the key distribution property, and "MODE #CH1 +xn userA", which is a command to grant the key update property and the order or sequence thereof, and executes corresponding processes.

When the coordinator 11 interprets commands such as a command to grant a channel encryption key and a command to set the encryption mode, the coordinator 11 reports to the key obtainer 4. The coordinator 11 also receives from the key obtainer 4 a command to request obtainment of a channel encryption key, and executes corresponding processes.

Once the coordinator 11 interprets a command to request a channel encryption key, the coordinator 11 reports the request to the key distributor 5. Also, upon receiving a request from the key distributor 5, the coordinator 11 accepts a command to grant a channel encryption key, and executes corresponding processes.

If the beginning of a text message sent to the chat client 10 includes an encryption flag such as a "1" or an encryption ID, the assignor 12 sends a command to decrypt to the encrypter/decrypter 8. More specifically, the assignor 12 sends the encryption flag or the encryption ID along with the encrypted conversation message to the encrypter/decrypter 8.

The assignor 12 can also accept a request from the user as whether or not to encrypt a conversation message. If encryption is requested, the inputted conversation message is 'sent to the encrypter/decrypter 8. The request to or not to encrypt can be made by switching a command button between on and off. The command button is shown on the users display screen using GUI (graphic user interface). The assignor 12 then handles the conversation message encrypted by the encrypter/decrypter 8 with an encryption flag or an encryption ID attached thereto, in a similar manner in which a regular conversation message is handled. In other words, the encrypted conversation message is given a send command by the chat client 10 as in the case with a regular conversation message, and is then sent out as a comment made in a chat system.

Process Flow

Figure 3:
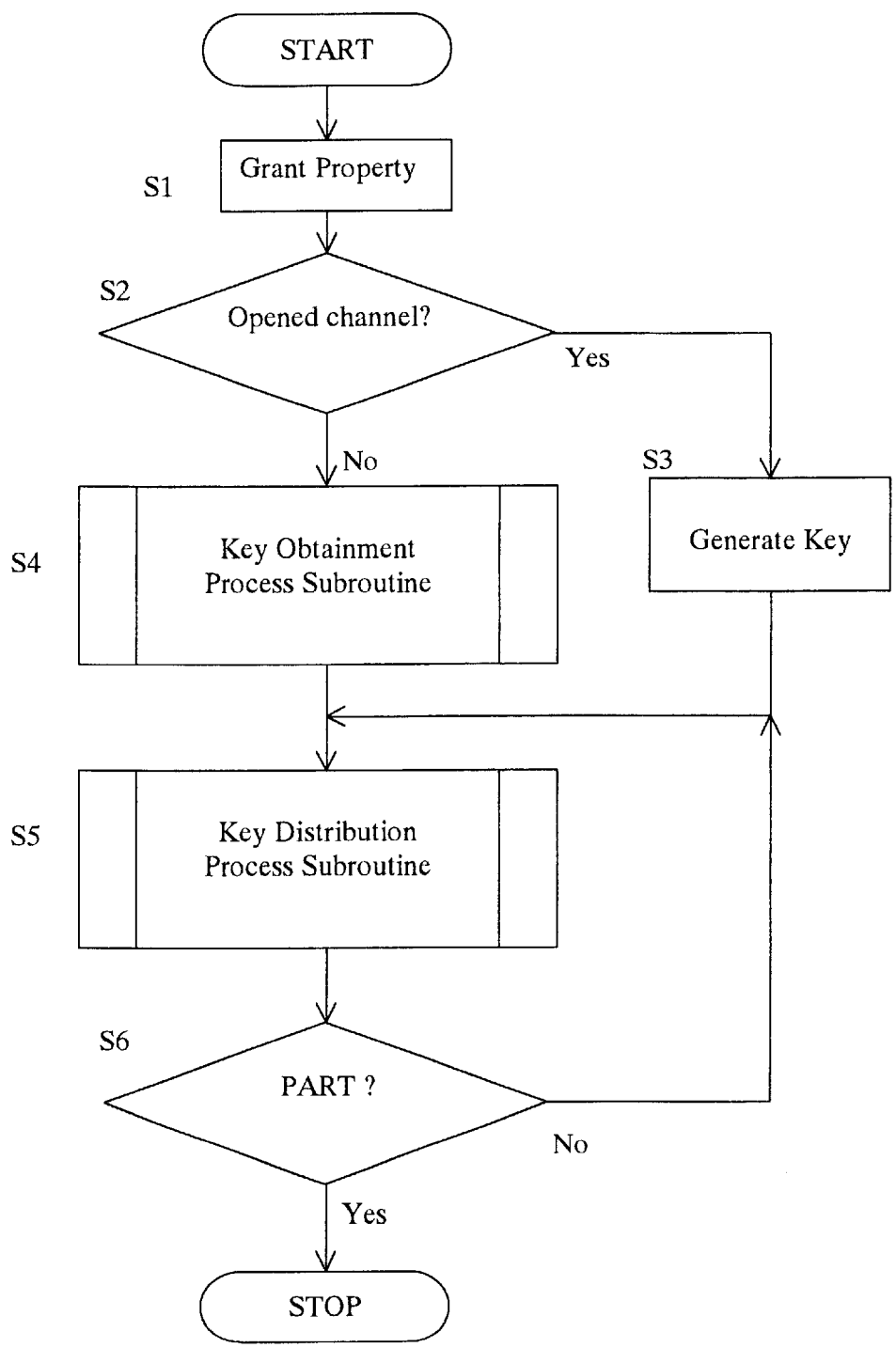
FIG. 3 is a flowchart showing the main process executed by security systems in accordance with selected embodiments of the present invention.
Figure 4:
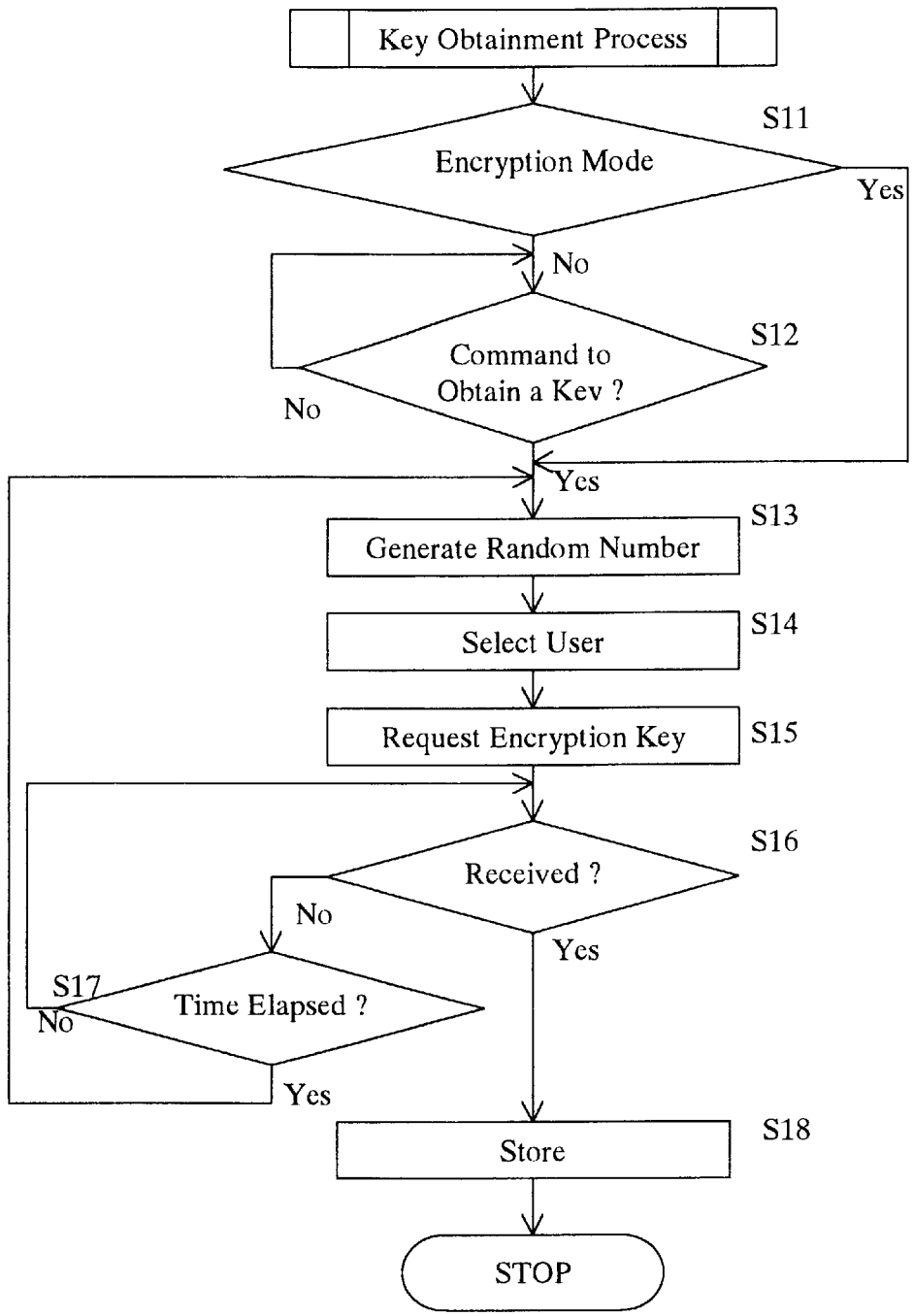
FIG. 4 is a flowchart showing the key obtainment process executed by security systems in accordance with selected embodiments of the present invention.
Figure 5:
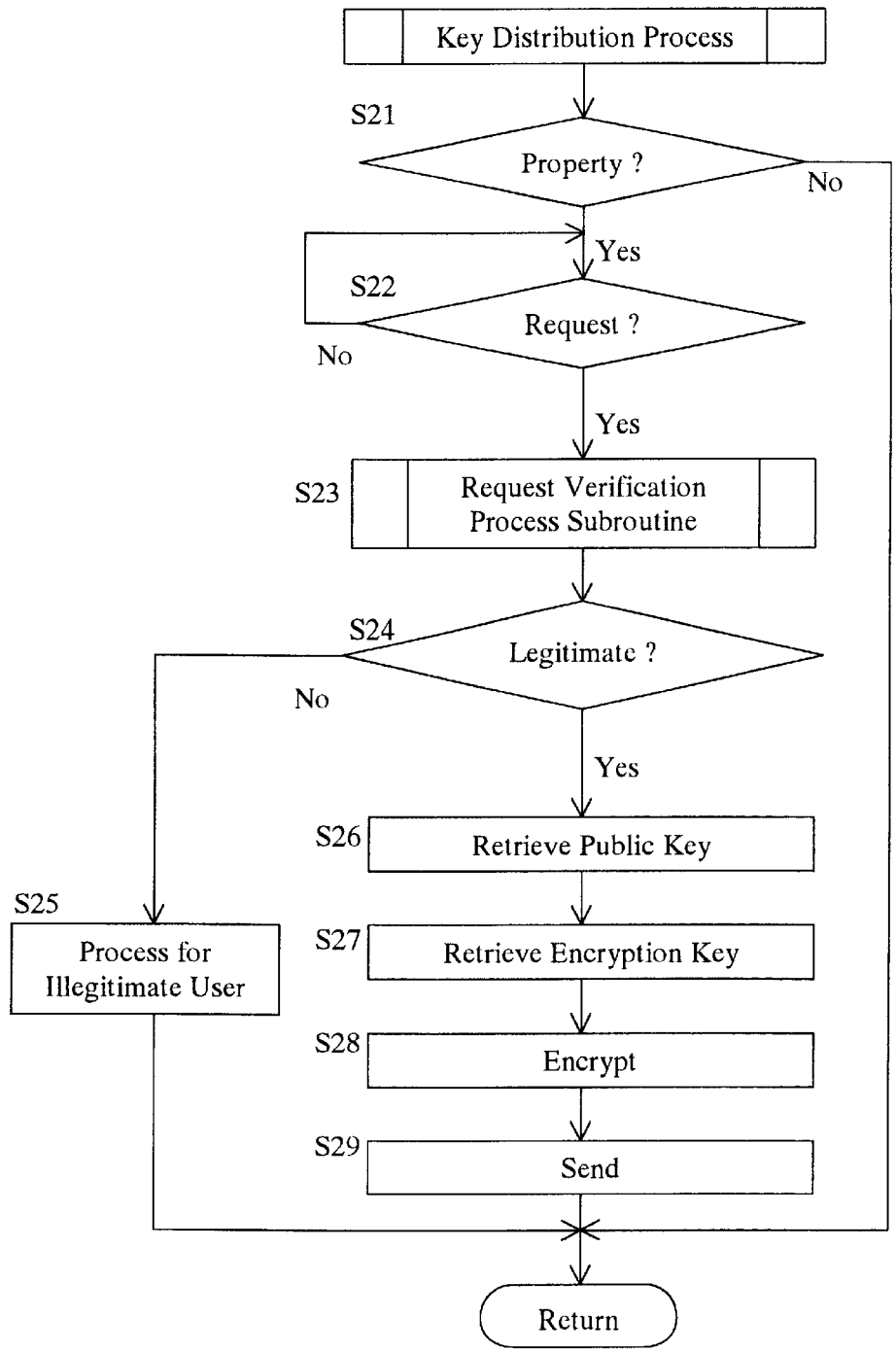
FIG. 5 is a flowchart showing the key distribution process executed by security systems in accordance with selected embodiments of the present invention.
Figure 6:
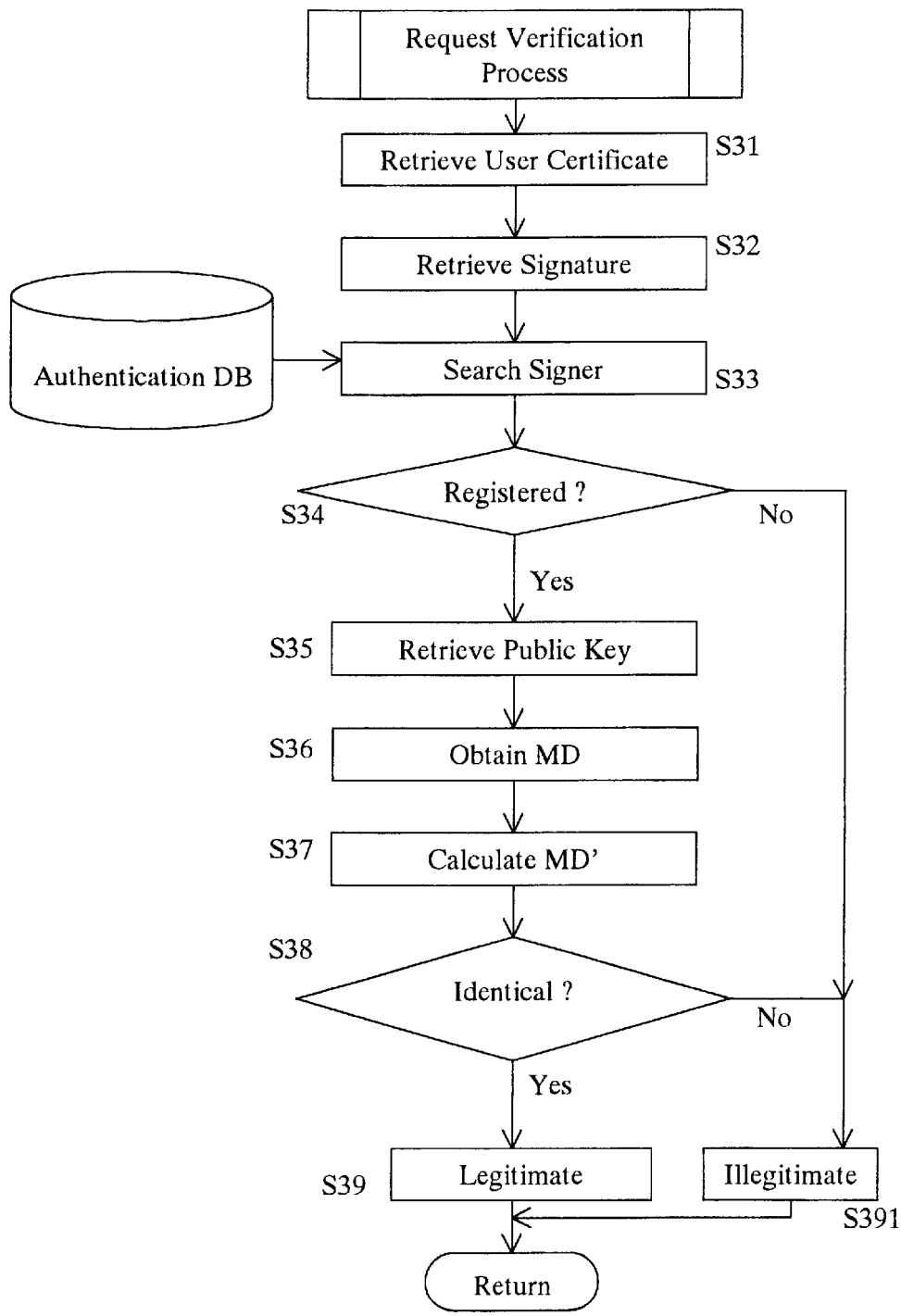
FIG. 6 is a flowchart showing the request verification process executed by security systems in accordance with selected embodiments of the present invention.
Figure 7:
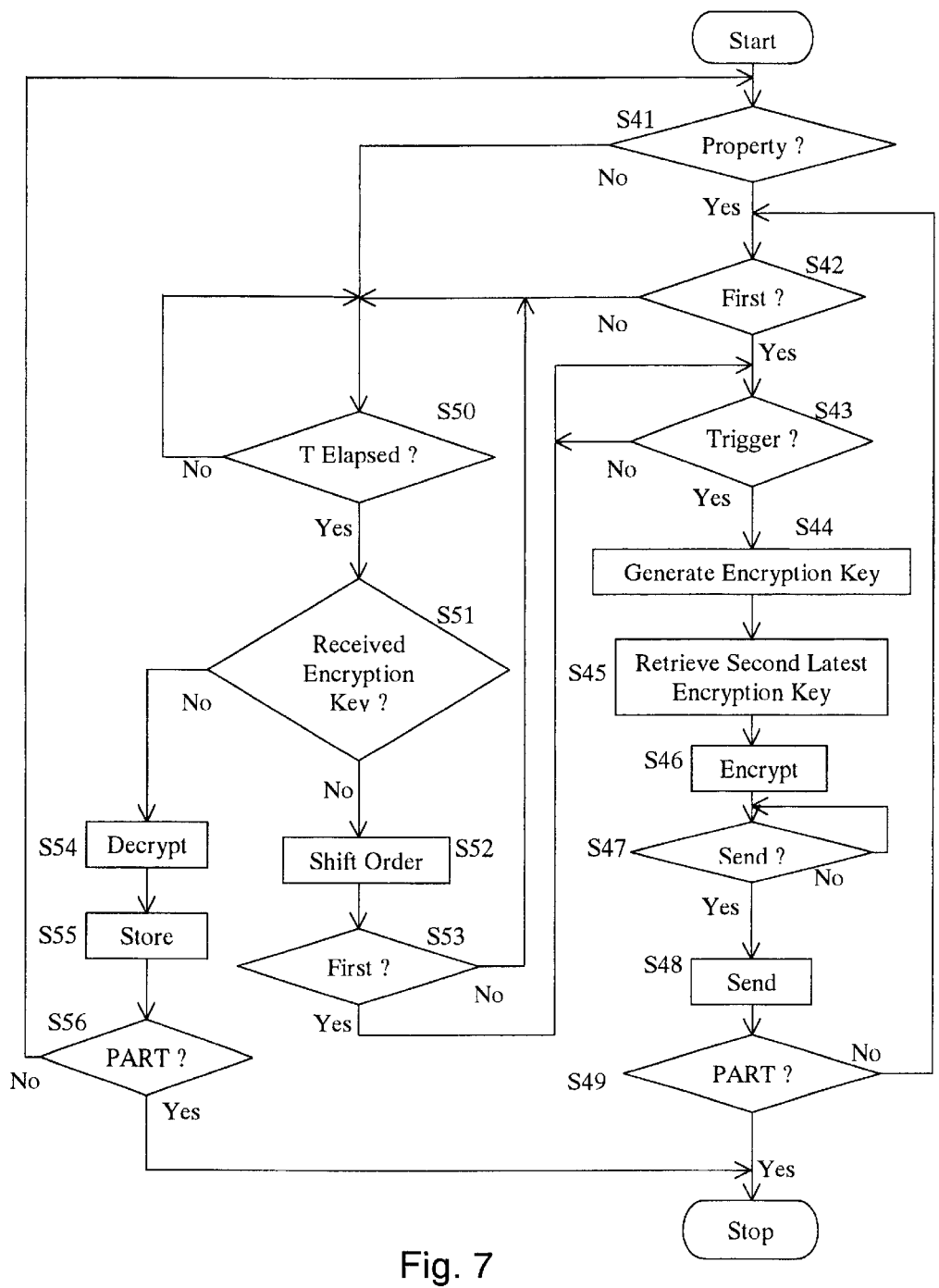
FIG. 7 is a flowchart showing the key update process executed by security systems in accordance with selected embodiments of the present invention.

A main process executed by the security system 1 will now be explained below. FIG. 3 is a flow chart that shows a process flow of a main routine executed by the security system 1. FIGS. 4–6 show details of processes that occur in the main routine. Specifically, FIG. 4 is a flow chart of a key obtainment process, in which a channel encryption key is obtained from another user terminal. FIG. 5 is a flow chart of a key distribution process, in which a channel encryption key is distributed to other user terminals. FIG. 6 is a flow chart of a request verification process, in which a request for a channel encryption key from another user is verified. FIG. 7 is a flow chart of a key update process, which is executed independently from the main routine, in which the channel encryption key is updated upon the occurrence of a predetermined condition or conditions.

(1) Main Routine

The process of the main routine shown in FIG. 3 starts as a chat client 10 in a user terminal participates in a channel or opens a channel. For the sake of simplicity, explained below is a case where the user who opened the channel is the channel operator which has been given the key distribution property and the key update property.

At step S1, the user administrator 3 sets the key distribution property and the key update property, such that the key distribution property and the key update property correspond to the channel operator property in the user information.

At step S2, the user administrator 3 determines whether the user has opened the channel. Of course, if there is only one user in the channel, then the only chat client that is participating in the channel is the users own chat client, which is the one that opened the channel. Therefore, the user administrator 3 proceeds to step S3. If there is more than one user in the channel, the users who did not open the channel do not proceed to step S3. Rather, the user administrator 3 of each of these users proceed to step S4 to obtain a channel encryption key.

At step S3, the key generator 7 generates a channel encryption key at the user terminal of the user who opened the channel. Furthermore, an encryption key ID is attached to the generated channel encryption key. Then the channel encryption key and the encryption key are stored in the encryption key list of the memorizer 2. The security system 1 of this user then proceeds to step S5.

At step S4, the users that did not open the channel request a channel encryption key from another user terminal through the key obtainment subroutine, and thereby obtains a channel encryption key. The key obtainment subroutine will be described in more detail later.

At step S5, users who have the key distribution property distribute the current channel encryption key to other user terminals through the key distribution subroutine, which will be described later.

At step S6, the security system 1 of each user determines whether the chat client 10 is leaving the channel or not. If the chat client 10 is leaving, the main routine process is terminated. If the chat client 10 is not leaving, the security system 1 returns to step S5, and distributes the channel encryption key upon request from another user.

Although not shown in the Figures, the user administrator 3 of each user receives a status report from its chat client 10 regarding a change in the user information in a manner separate from the main routine. The user administrator 3 updates the key distribution property and the key update property according to the reports.

(2) Key Obtainment Process

The key obtainment process occurs at step S4 of the main routine. The key obtainment process is explained with reference to FIG. 4.

At step S11, the key obtainer 4 determines whether the encryption mode is on or off. If the encryption mode is on, then all conversation messages are encrypted. Therefore, the key obtainer 4 proceeds to step S13 to obtain a channel encryption key. If the encryption mode is off, the key obtainer 4 proceeds to step S12.

At step S12, the key obtainer 4 determines whether the encrypter/decrypter 8 has issued a command to obtain a key. If a conversation message with an encryption flag such as "1"or an encryption key ID attached thereto is received while a channel encryption key has not been obtained, the encrypter/decrypter 8 should send a command to the key obtainer 4 to request obtainment of a key. At step S12, the key obtainer 4 waits for the command from the encrypter/decrypter 8, and proceeds to step S13 when the command is issued.

At step S13, the key obtainer 4 generates a random number to select a user from other users in the channel.

At step S14, based on the random number generated, the key obtainer 4 selects a user from the other users in the channel that have the key distribution property.

At step S15, the key obtainer 4 of the requesting user retrieves from its memorizer 2 a public key. The key obtainer 4 of the requesting user attaches the channel name and nickname to the requesting user's user certificate that includes the public key of the requesting user. The key obtainer 4 of the requesting user sends out a request for a channel encryption key to the selected user. As described above, if the encrypted conversation message requires a particular channel encryption key identified by an encryption key ID that is attached to the encrypted conversation message, the key obtainer 4 requests the channel encryption key by specifying the encryption key ID. If a channel encryption key is requested because the encryption mode is turned on or an encrypted conversation message is received with an encryption flag "1" attached thereto, the key obtainer 4 sends a request for a channel encryption key without specifying an encryption key ID.

At step S16, the key obtainer 4 determines whether the requesting user has received a channel encryption key and its encryption key ID or not. If the requesting user has not received the channel encryption key and the encryption key ID, the key obtainer 4 of the requesting user proceeds to step S17. If the requesting user has received them, the key obtainer 4 of the requesting user proceeds to step S18.

At step S17, the key obtainer 4 determines whether a predetermined time T has elapsed. If the time T has not elapsed, the key obtainer 4 of the requesting user returns to step S14, and waits for the channel encryption key. If the predetermined time T has elapsed, the key obtainer 4 of the requesting user determines that the selected user is not able to send the channel encryption key for some reason, and returns to step S13 to select another user terminal for obtaining a current channel encryption key.

At step S18, the key obtainer 4 of the requesting user decrypts the encryption key that the requesting user received, using the private key of the requesting user, thereby obtaining the channel encryption key. The key obtainer 4 stores in the encryption key list the channel encryption key along with the encryption key ID that the requesting user received along with the encryption key. Then, the key obtainment process is terminated.

(3) Key Distribution Process

The key distribution process occurs at step S5 of the main routine. The key distribution process is explained with reference to FIG. 5.

At step S21, the key distributor 5 refers to the user information, and thereby determines whether the user terminal has the key distribution property. If the user terminal does not have the key distribution property, the process is terminated. Otherwise, the key distributor 5 of the user proceeds to step S22.

At step S22, the key distributor 5 of the user determines whether the user terminal has received a request for a channel encryption key from another user terminal. If the user terminal has received a request for a channel encryption key, the key distributor 5 proceeds to step S23. Otherwise, the key distributor 5 waits until the user terminal receives a channel encryption key.

At step S23, the key distributor 5 executes a request verification subroutine, in which the legitimacy of the requesting user is verified and a verification result is obtained. Details of the request verification subroutine will be described later.

At step S24, the key distributor 5 determines whether the requesting user is legitimate or not based on the verification result. If the requesting user is not legitimate, the key distributor 5 proceeds to step S25. If the requesting user is legitimate, the key distributor 5 proceeds to step S26.

At step S25, the key distributor 5 executes processes such as sending a message to the illegitimate user to inform that the channel encryption key can not be delivered.

At step S26, since the legitimacy of the requesting user has been verified, the key distributor 5 retrieves a public key of the requesting user from the requesting user's user certificate, which is sent along with the request for a channel encryption key.

At step S27, the key distributor 5 retrieves the latest channel encryption key from the encryption key list. If an encryption key ID has been sent with the request, the key distributor 5 retrieves a channel encryption key that corresponds to the encryption key ID, instead of the latest key. Then, the key distributor 5 obtains an encryption key ID of the retrieved channel encryption key by applying hash function to the channel encryption key.

At step S28, the key distributor 5 encrypts the channel encryption key with the public key of the requesting user.

At step S29, the key distributor 5 sends the encrypted channel encryption key and the encryption key ID to the requesting user terminal via the chat client 10. The key distributor 5 returns to the main routine.

(4) Request Verification Process Subroutine

The request verification process occurs at step S23 of the key distribution subroutine. The request verification process is explained with reference to FIG. 6.

At step S31, the key distributor 5 retrieves the user certificate of the requesting user, which has been sent along with the request for a channel encryption key.

At step S32, the key distributor 5 retrieves an electronic signature from the user certificate.

At step S33, the key distributor 5 searches for the retrieved electronic signature from the authentication database. Each authorized user terminal is usually provided with an authentication database. The authentication database includes information based upon the issued user certificates, including electronic signatures issued by a Certificate Authority (CA).

At step S34, the key distributor 5 determines whether the electronic signature is registered in the authentication database (DB) based on the result of the search. If the electronic signature is not registered, the key distributor 5 proceeds to step S391. If the electronic signature is registered, the key distributor 5 proceeds to step S35.

At step S35, the key distributor 5 retrieves the public key of the authenticator from the authentication database (DB).

At step S36, the key distributor 5 decrypts the electronic signature with the public key of the authenticator, thereby obtaining a message digest (MD) of the user certificate.

At step S37, the key distributor 5 retrieves a portion of the user certificate to which the electronic signal is applied, and calculates a message digest (MD') using a conventional algorithm. Examples of such conventional algorithm include MD5 and SHA.

At step S38, the key distributor 5 compares the two message digests, and proceeds to step S39 if the message digests are identical. If the message digests are different, the key distributor 5 proceeds to step S391.

At step S391, the key distributor 5 determines that "the requesting user is legitimate".

At step S391, the key distributor 5 determines that the requesting user is illegitimate, and sends a report to the requesting user to inform the illegitimacy.

(5) Key Update Process

The key update process, which is executed independently from the main routine, is explained with reference to FIG. 7.

At step S41, the key updater 6 determines whether the user terminal has the key update property, by referring to the user information. If the user terminal does not have the key update property, the key updater 6 proceeds to step S50. If the user terminal has the key update property, the key updater 6 proceeds to step S42.

At step S42, the key updater 6 determines whether the update sequence or order of the user terminal, which is given together with the key update property. Specifically, the key updater 6 at step S42 determines whether the user terminal is first (next) or not. If the order or sequence is first, the key updater 6 proceeds to step S43. If the order or sequence is second or later, the key updater 6 proceeds to step S50. Details of step S50 will be described later.

At step S43, the key updater 6 waits for a predetermined trigger. If a predetermined trigger occurs, the key updater 6 proceeds to step S44. For the sake of simplicity, it is assumed here that a channel encryption key is updated when there is only one user in the channel or when a predetermined period of time elapses. More specifically, the key updater 6 proceeds to step S44 when there is only one user left in a channel, or when a predetermined period of time elapses since the last time a channel encryption key is updated, even if there are still more than one users in the channel.

At step S44, the key updater 6 generates a channel encryption key according to a predetermined rule. For instance, a new channel encryption key can be generated by applying a hash function to a combination of an address of the user terminal in which this program is stored, the time at which the trigger occurred, a password for the channel, and the channel name. An encryption key ID for the new channel encryption key is obtained by applying hash function to the new channel encryption key.

At step S45, the key updater 6 obtains the second latest channel encryption key from the encryption key list.

At step S46, the key updater 6 encrypts the new encryption key with the second latest channel encryption key.

At step S47, the key updater 6 determines when the encrypted new channel encryption key should be sent out based on frequency of conversation message at the time. For instance, if a predetermined period of time elapsed since the last comment made, the key updater 6 determines that the conversation has finished, and proceeds to step S48. Otherwise, the key updater 6 determines that the conversation still continues intermittently, and repeats step S47 to wait for the conversation to finish.

At step S48, the key updater 6 sends the encrypted new channel encryption key and the encryption key ID to other user terminals via the chat client 10.

At step S49, it is determined whether the chat client 10 of the user terminal has left from the channel. If the chat client 10 has left, the process is terminated. Otherwise, the key updater 6 returns to step S42, and repeats the above mentioned processes.

If it is determined that the user terminal does not have the key update property at step S41, or if the order or sequence of the key update property is second or later at step S42, the key updater 6 proceeds to step S50 to obtain a new channel encryption key.

At step S50, the key obtainer 4 waits until a predetermined period of time elapses since the last time a channel encryption key is updated. The key obtainer 4 proceeds to step S51 when the predetermined period of time elapses. In this embodiment, the key obtainer 4 monitors the amount of time since the last time the channel encryption key was updated by monitoring an internal clock inside the user terminal.

At step S51, the key obtainer 4 determines whether the user has received a new channel encryption. If the user has not received a new channel encryption key, the key obtainer 4 requests the user administrator 3 to shift the key updating order or sequence upward, and then proceeds to step S52. If the user receives a new channel encryption key, the key obtainer 4 proceeds to step S54. Details of step S54 will be described later.

At step S52, the user administrator 3 shifts up the key updating sequence or order of the user, whose order or sequence of the key update property has been by then second or later, thereby rewriting the user information. In this way, the order or sequence of all the users whose position in the key updating sequence have been second or later prior to the rewriting are shifted to the next earlier positions.

At step S53, the key updater 6 determines whether the order or sequence of the user has become first in the sequence due to the rewriting. If the order or sequence is first in the key updating sequence, the key updater 6 proceeds to step S43 to change the channel encryption key. If the order or sequence in the key updating sequence is second or later, the key updater 6 proceeds to step S50 to obtain a new channel encryption key.

At step S54, now that a new channel encryption key is obtained from another user terminal, the key obtainer 4 decrypts the encrypted channel encryption key using the second latest channel encryption key next to the newly received channel encryption key, thereby obtaining a new channel encryption key.

At step S55, the key obtainer 4 stores the new channel encryption key and the new corresponding encryption key ID in the encryption key list in the memorizer 2, such that the channel encryption key and the encryption key ID correspond to each other.

At step S56, the security system 1 determines whether the chat client 10 of this user terminal has left from the channel. If the chat client 10 has left, the process is terminated. Otherwise, the security system 1 returns to step S41, and repeats the previously described processes.

Second Embodiment

If two chat clients 10 conduct a one-to-one conversation, the key obtainer 4 of the user terminal which starts the conversation sends a request for a session key to the other user terminal, with the public key of the requesting user terminal attached thereto.

In the requested user terminal, the key generator 7 generates a session key, and sends the session key to the requesting user after encrypting the session key with the public key of the requesting user. As in the first embodiment, the session key can be generated by applying hash function to a combination of information unique to requesting and requested user terminals, time, and secret information stored inside the user terminal.

Also, similar to the first embodiment, a new session key should be sent to the requesting user after encrypting the new session key with the second latest session key next to the newly generated session key. It is also similar to the first embodiment that the new session key should be encrypted with the public key of the requesting user terminal before sending the session key to the requesting user.

The key obtainer 4 of the requesting user terminal decrypts the session key using its own private key, and stores the session key in the memorizer 2. Thereafter, these users send messages to each other after encrypting the messages with the session key.

The timings and conditions of updating the session key are similar to those in the first embodiment. That is, the session key is updated when a predetermined period of time elapses, when there is more than a predetermined number of conversation messages, or when there is more than a predetermined data amount of conversation message. The session key can be updated either by the user who started the conversation, or by the other user. The session key can also be updated by the user who sent the last message, or by the user who received the last message.

Obviously, the key distributor 5 of the user terminal that received a request for starting conversation verifies the legitimacy of the public key attached to the request. If the public key is illegitimate, the key distributor 5 of the requested user terminal rejects the request. One example of legitimate public key include a public key with an electronic signature of the authenticator, which is usually stored inside a user terminal. Another example of legitimate public key include a public key with an electronic signature of the server to which the user terminal is connected, or a public key with an electronic signature of the requesting user.

Third Embodiment

Although in the first embodiment the key distribution property and the key update property are granted by the user administrator 3, which is in the security system 1, the key distribution property and the key update property can also be granted in other ways. For instance, the channel encryption key distribution property and the key update property can be granted as part of user property on the chat system, in a similar manner in which the channel operator property is granted. In this case, each chat client 10 retrieves the key distribution property and the key update property from the chat server, as part of the user information, together with nickname and the channel operator property. The chat client 10 then stores this information in user information database (DB) 9. The security system 1 refers to the user information in the user information database (DB) 9 to execute the previously described processes.

Fourth Embodiment

Although the key obtainer 4 monitors the times at which the channel encryption key should be updated in the first embodiment, it is also possible to determine times at which the channel encryption key is updated in other ways. For instance, the key generator 7, the key distributor 5, and the key updater 6 send a channel encryption key together with the time at which the channel encryption key should be updated. In other words, each user terminal has a channel encryption key and expiration time of the channel encryption key. In this way, the key obtainer 4 of each user terminal recognizes that the expiration time of the channel encryption key is the time when the channel encryption key should be updated. By sending the channel encryption key together with the expiration time thereof, it is possible to configure a channel encryption key such that the channel encryption key is updated at every predetermined period of time or at any desired time.

However, internal clocks of different user terminals may have different times. In this case, the expiration time of a channel encryption key should be described with a relative time and a base time, rather than the time according to the internal clock. The base time is the time at which the channel encryption key is generated. The relative time is preferably the length of time since the time at which channel encryption key was generated. Alternatively, the relative time is the length of time before expiration of the channel encryption key.

A channel encryption key can also be updated when certain situations arise. For example, the channel encryption key can be updated when there is only one user left in the channel, as opposed to when a predetermined time comes. In this case, it is possible that a channel encryption key is not updated for a long time because the predetermined situation has not arisen. Following measures can be taken to prevent this from happening.

Usually, an algorithm used for generating a key provides the key with an expiration time. The key generator 7, the key distributor 5, and the key updater 6 can send to each user terminal the channel encryption key together with the expiration time. If the predetermined situation has not arisen until the expiration time of the channel encryption key, the key obtainer 4 determines that the expiration time is the time when the channel encryption key should be updated.

Effect of Invention

The present invention allows a channel encryption key to be administered in a manner dispersed among chat clients 10, whereby users can share the channel encryption keys by distributing the channel encryption key after encrypting the key with public key encryption.

Since a channel encryption key is generated and distributed among users without any involvement of the chat server therein, messages are not likely to be decrypted by an unwelcome party at the chat server. Accordingly, privacy of conversation in a channel can be better protected. Also since the users encrypt and decrypt messages, the burden of encrypting/decrypting is dispersed among users, thereby relieving the chat server's burden.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A security method of ensuring privacy and security in a communication system where communication devices are configured to conduct simultaneous two-way communication via a single network, said security method comprising:

storing a plurality of encryption keys and corresponding key identifications in each communication device;

obtaining from one of the communication devices predetermined user information when a communication device participates in the network and storing the user information including at least a list of the other communication devices that participate in the network in the participating communication device;

selecting a communication device from the other communication devices in the stored list, requesting from the selected communication device the stored encryption key of the selected communication device, and storing the requested encryption key sent from the selected communication device in response to the requesting;

distributing a stored encryption key to a requesting communication device, upon receiving a request for the stored encryption key from the requesting communication device to the requesting communication device;

receiving communication contents from at least one of the communication devices and encrypting the communication contents using one of the stored encryption keys, and transmitting to one of the other communication devices via the network the encrypted communication contents along with the corresponding key identification identifying one of the stored encryption keys used to encrypt the communication contents; and receiving encrypted communication contents and a key identification from at least one of the communication devices and decrypting the communication contents by examining whether an encryption key identified by the key identification is previously stored, and requesting the encryption key from one of the communication devices by specifying the identification key, if the encryption key is not previously stored.

2. A security system to be utilized in a communication device adapted to conduct simultaneous two-way communication with other communication devices sharing a single network, said security system comprising;

memorizing means for memorizing an encryption key adapted to encrypt and decrypt communication contents within the shared network;

encrypting means for obtaining communication contents from the communication device and encrypting the communication contents with the encryption key;

decrypting means for obtaining communication contents from the communication device and decrypting the communication contents with the encryption key;

user administering means for obtaining from the communication device predetermined user information when the communication device participates in the network, and storing the user information in said memorizing means, the user information including at least a list of other communication devices that participate in the network;

key obtaining means for selecting a communication device from one of the other communication devices in the list, requesting an encryption key from the selected communication device, and storing the encryption key in said memorizing means when the encryption key is sent from the selected communication device upon the request; and key distributing means for retrieving an encryption key from said memorizing means and distributing the encryption key to another communication device when the another communication device sent a request for the encryption key;

wherein
said memorizing means stores a plurality of encryption keys and corresponding key identifications, said encryption means sends a key identification and communication contents to the network via the communication device said key identification identifying the encryption key used for encrypting the communication content, said decrypting means examines whether an encryption key identified by the key identification is stored in said memorizing means, and if the encryption key identified by the key identification is not stored in said memorizing means, said key obtaining means requests obtainment of the encryption key by specifying the key identification.

3. A security system as set forth in claim 2, wherein said security system is adapted to be coordinated with coordinating means of the communication device; and the coordinating means is adapted to relay between the communication device and said security system a request for an encryption key, the encryption key sent upon the request, information regarding the user information and communication contents, with the communication contents being relayed only when a predetermined condition is met.

4. A security system as set forth in claim 2, wherein said user administering means grants key distribution property based on the user information and stores the key distribution property in said memorizing means, the key distribution property being adapted to allow distribution of an encryption key to another security system.

5. A security system as set forth in claim 2, wherein said user administering means selects another communication device based on a predetermined condition, grants key distribution property to the selected communication device, obtains from the communication device a setting of the key distribution property and a name of a communication device to which the setting applies, and stores the setting and the name of the communications device in said memorizing means.

6. A security system as set forth in claim 2, wherein said user administering means accepts a selection of another communication device, and a command for granting and canceling the key distribution property to the selected communication device, the key distribution property allowing distribution of an encryption key, obtains from the selected communication device a setting of the key distribution property and a name of the communication device to which the setting applies, and stores the setting and the name of the communication device in said memorizing means.

7. A security system as set forth in claim 2, wherein said key obtaining means selects, based on a predetermined condition, a communication device from which an encryption key is requested.

8. A security system as set forth in claim 2, wherein said key obtaining means selects, based on a predetermined condition, a communication device from which an encryption key is requested, requests an encryption key from the selected communication device, and if the communication device does not send the encryption key within a predetermined period of time, selects another communication device for requesting an encryption key therefrom.

9. A security system as set forth in claim 2, wherein said key obtaining means requests obtainment of an encryption key when the communication contents are encrypted.

10. A security system as set forth in claim 2, wherein said decrypting means determines that a request for an encryption key should be made when communication contents received from the communication device cannot be decrypted; and said key obtaining means requests obtainment of an encryption key based on the determination of said decrypting means.

11. A security system as set forth in claim 2, wherein said key obtaining means sends a public key user from a public key encryption system along with the request for an encryption key, and decrypts the encryption key with a private key of the requesting user from the public key encryption system when the encryption key is sent; and said key distributing means distributes an encryption key after encrypting the encryption key with the public key from the public key from the public key encryption system of the requesting user.

12. A security system as set forth in claim 2, wherein when a request for an encryption key is sent from a requesting communication device one of the other communication devices, said key distributing means is adapted to verify the request, retrieve one of the encryption keys based on a result of the verification, and send the encryption key to the requesting communication device.

13. A security system as set forth in claim 2, further including key updating means for updating an encryption key at a predetermined time, and distributing the updated encryption key to other communication devices.

14. A security system as set forth in claim 2, further including key updating means for updating an encryption key at a predetermined time, and distributing the updated encryption key to other communication devices after encrypting the updated encryption key with the last encryption key.

15. A security system as set forth in claim 13, wherein said key updating means generates an encryption key based on at least a combination of one of the following information: secret information stored inside each communication device, time information, and information unique to the network.

16. A security system as set forth in claim 13, wherein said key updating means generates an encryption key by applying a one-way function, to any or a combination of secret information stored inside each communication device, time information, and information unique to the network.

17. A security system as set forth in claim 2, wherein
said security system further including key updating means for updating an encryption key at a predetermined time based on a setting of a key updated property, and distributing the encryption key to the other communication devices; and
said user administering means sets said key update property based on the user information obtained, with said key update property being adapted to allow updating and distribution of an encryption key, and said key update property further being adapted to store the key update property in said memorizing means.

18. A security system as set forth in claim 2, wherein
said security system further including key updating means for updating an encryption key at a predetermined time based on a setting of a key update property, and distributing the encryption key to other communication devices; and
said user administering means is adapted to select another communication device based on a predetermined condition when the user has said key update property which allows distribution of an encryption key, said key update property being adapted to grant said key update property to selected communication device, said key update property being adapted to obtain a setting of said key update property and a name of the communication device to which the setting applies, and said key update property being adapted to store the setting and the name of the communication device in said memorizing means.

19. A security system as set forth in claim 2, wherein
said security system further including key updating means for updating an encryption key at a predetermined time based on a setting of a key update property and an updating sequence, and distributing the encryption key to other communication devices; and
said user administering means grants said key update property and the updating sequence based on the obtained user information, and stores said key update property and the updating sequence in said memorizing means, with said key update property being adapted to update and distribution of an encryption key.

20. A security system as set forth in claim 2, wherein
said security system further including key update means for updating an encryption key at a predetermined time based on a setting of a key update property and an updating sequence, and distributing an encryption key to other communication devices; and
said user administering means is adapted to select another communication device based on a predetermined condition when a user has said key update property, said key update property allowing updating and distribution of the encryption key, said key update property being adapted to grant the key update property and an updating sequence to the communication device, said key updating property being adapted to obtain from the communication device settings for the key update property, the updating sequence and a name of the communication device to which the settings apply, said key update property being adapted to store the settings and the name of the communication device in said memorizing means, and rewrite the updating sequence as the user information changes.

21. A communication system comprising:
a plurality of communication devices adapted to conduct simultaneous two-way communication sharing a single network, each of said communication devices including:
memorizing means for memorizing an encryption key adapted to encrypt and decrypt communication contents within the shared network;
encrypting means for obtaining communication contents from the communication devices, and encrypting the communication contents with the encryption key;
decrypting means for obtaining communication contents from the communication devices and decrypting the communication contents with the encryption key,
user administering means for obtaining from the communication device predetermined user information when the communication device participates in the network, and storing the user information in said memorizing means, the user information including at least a list of other communication devices that participates in the network,
key obtaining means for selecting a communication device from the communication devices in the list, requesting an encryption key from the selected communication device, and storing the encryption key in said memorizing means when the encryption key is sent from the selected communication device upon the request; and
key distributing means for retrieving an encryption key from said memorizing means and distributing the encryption key to another communication device when the another communication device sent a request for the encryption key;
wherein
said memorizing means stores a plurality of encryption keys and corresponding key identifications,
said encryption means sends a key identification and communication contents to the network via the communication device, said key identification identifying the encryption key used for encrypting the communication content.
said decrypting means examines whether an encryption key identified by the key identification is stored in said memorizing means, and
if the encryption key identified by the key identification is not stored in said memorizing means, said key obtaining means requests obtainment of the encryption key by specifying the key identification.

22. A computer readable recording medium to be utilized in a communication device adapted to conduct simultaneous two-way communication with other communication devices sharing a single network, said computer readable recording medium containing a security program therein, to control the communication device according to a process comprising:
storing an encryption key adapted to encrypt and decrypt communication contents within the shared network;
encrypting the communication contents with the encryption key;
decrypting the communication contents with the encryption key;
obtaining from the communication device predetermined user information when the communication device participates in the network, and storing the user information in memorizing means, with the user information including at least a list of other communication devices that participate in the network;
selecting a communication device from the communication devices in the list, requesting an encryption key from the selected communication device, and storing the encryption key in the memorizing means when the encryption key is sent from the selected communication device upon the request; and retrieving an encryption key from the memorizing means and distributing the encryption key to another communication device when the another communication device sent a request for the encryption key;

wherein the storing comprises storing a plurality of the encryption keys and corresponding key identifications, the encrypting comprises sending a key identification and communication contents to the network via the communication device, said key identification identifying the encryption key used for encrypting the communication content, the decrypting comprises determining whether an encryption key identified by the key identification is stored, and if the encryption key identified by the key identification is not stored, requesting the encryption key by specifying the key identification.

* * * * *

UNITED STATES PATENT AND TRADEMARK OFFICE
CERTIFICATE OF CORRECTION

PATENT NO. : 6,711,264 B1
DATED : March 23, 2004
INVENTOR(S) : Tatsuro Matsumoto et al.

It is certified that error appears in the above-identified patent and that said Letters Patent is hereby corrected as shown below:

Title page,
Add *Assistant Examiner* -- Kambie Zand --

Column 26,
Line 30, delete "to the requesting communication device";

Column 27,
Line 18, after "device" insert -- , --.

Column 28,
Lines 13 and 14, replace current claim 9 with the following:
-- A security system as set forth in claim 2, wherein said key obtaining means requests obtainment of an encryption key when the communication contents are encrypted. --.

Signed and Sealed this

Ninth Day of November, 2004

JON W. DUDAS
*Director of the United States Patent and Trademark Office*